United States Patent
Klein et al.

(10) Patent No.: US 8,544,939 B2
(45) Date of Patent: Oct. 1, 2013

(54) CAB TILT WITH MULTIFUNCTION FLAG PIN

(75) Inventors: Daniel R Klein, Asbury, IA (US);
Robert P Dressler, Lancaster, WI (US);
James G Merten, Peosta, IA (US);
Jaime M Nedved, Dubuque, IA (US);
Alana J Kennedy, Peosta, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/021,165

(22) Filed: Feb. 4, 2011

(65) Prior Publication Data

US 2012/0200116 A1 Aug. 9, 2012

(51) Int. Cl.
*B62D 33/067* (2006.01)

(52) U.S. Cl.
USPC ............ 296/190.03; 296/190.05; 296/190.07; 180/89.14

(58) Field of Classification Search
USPC ............. 296/190.04, 190.05, 190.06, 190.07, 296/190.03; 180/89.14, 89.18
See application file for complete search history.

(56) References Cited

U.S. PATENT DOCUMENTS

| | | | |
|---|---|---|---|
| 7,607,721 B2 | 10/2009 | Grimes et al. | |
| 7,828,371 B2 * | 11/2010 | Murakami | 296/190.03 |
| 8,128,155 B2 * | 3/2012 | Ansorge | 296/190.03 |
| 2004/0201257 A1 * | 10/2004 | Nilsson et al. | 296/190.07 |
| 2004/0245806 A1 * | 12/2004 | Mori et al. | 296/187.03 |
| 2006/0261640 A1 * | 11/2006 | Mori et al. | 296/190.07 |
| 2007/0278811 A1 * | 12/2007 | Derham et al. | 296/35.1 |
| 2008/0106122 A1 * | 5/2008 | Grimes et al. | 296/190.05 |
| 2009/0140547 A1 * | 6/2009 | Murakami | 296/190.08 |
| 2010/0176624 A1 | 7/2010 | Kamimae | |
| 2010/0320802 A1 * | 12/2010 | Miyasaka | 296/190.03 |
| 2011/0057478 A1 * | 3/2011 | Van der Knaap et al. | 296/190.07 |
| 2012/0274097 A1 * | 11/2012 | Miyasaka | 296/190.03 |

* cited by examiner

*Primary Examiner* — Jason S Morrow
(74) *Attorney, Agent, or Firm* — Faegre Baker Daniels LLP

(57) ABSTRACT

An operator cab for a work vehicle is releasably mounted to a frame of the vehicle via a cab support pin and a flexible mount during vehicle work operations and rotationally attached via the cab support pin for servicing working parts of the work vehicle. An anchor arrangement for the cab support pin helps to maintain the position of the cab with respect to the cab support pin during work and service operations.

20 Claims, 11 Drawing Sheets

CAB TILT WITH MULTIFUNCTION FLAG PIN

FIELD OF THE INVENTION

This disclosure relates to tilting mechanisms and, more particularly, to tilting mechanisms for pivotally mounted operator cabs for work vehicles.

BACKGROUND OF THE INVENTION

Operator cabs for work vehicles are often mounted over working components of the vehicles such as engines, transmissions, etc., which usually generate noise and vibration. Thus, in order to reduce the noise and vibration experience of operators, operator cabs are, at times, mounted to the frames of the vehicles via flexible connections designed to absorb vibrations and to, thereby, reduce noise inside the cabs. These cabs must have travel limiting devices as part of the roll over protection structure (ROPS) to restrict cab travel empowered by the flexible mounts as unexpected loads may enable cab travel to greater distances than acceptable. Further, such operator cabs must be somehow removable with respect to the frame of the vehicle in order to allow room to effect the inevitable servicing of the working components over which they, i.e., the cabs, are positioned. Traditionally, such cabs are removed from the service area via rotation toward the front, the rear, or either side of the vehicle using a corresponding hinge at the axis of rotation (see, for example, U.S. Pat. No. 7,607,721) or completely removed, via lift-off, from the frame of the vehicle (see, for example, US Patent Application Publication 2010/017662 A1) but these traditional solutions tend to be complex and/or inefficient when flexible mounts are used due to the nature and structure of the flexible mounts.

SUMMARY OF THE INVENTION

A vehicle includes a frame and an operator cab. The operator cab is attached to the frame via at least one mounting assembly capable of flexibly mounting the cab to the frame in a first adjustment and pivotally connecting the cab to the frame in a second adjustment where the first adjustment is for cab isolation and roll over protection during vehicle operations and the second adjustment is for service access to the vehicle. A flag pin serves as a motion limiting device for roll over protection in the first adjustment and as part of the pivotal connection in the second adjustment.

BRIEF DESCRIPTION OF THE DRAWINGS

Embodiments of the invention will be described in detail, with references to the following figures, wherein.

DESCRIPTION OF THE PREFERRED EMBODIMENT

Figure 1:
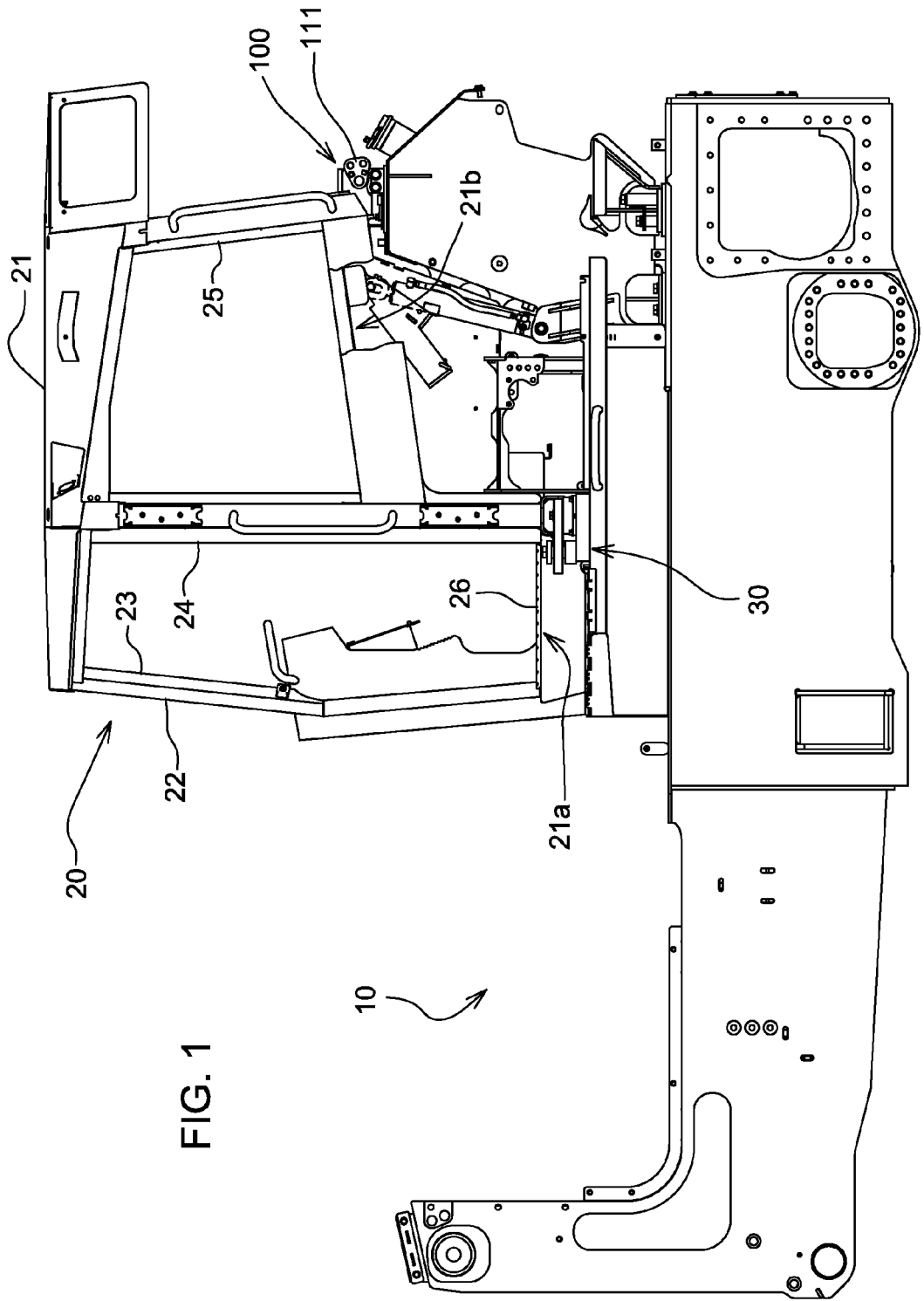
FIG. 1 is a side view of a frame for a work vehicle having an operator cab releasably mounted to it (the frame) via a front mounting assembly and a rear mounting assembly.

FIG. 1 illustrates an exemplary embodiment of a frame 10 of a working vehicle such as, for example, a dozer (not shown) having ground engaging tracks (not shown) and an operator cab 20. Underneath the cab 20, and attached to the frame 10 may be other conventional working components (not shown) of the vehicle which help to generate noise and vibration underneath the cab 20. Attaching the cab 20 to the frame 10 are front cab support assemblies 30 and rear cab support assemblies 100 on the left and right sides of the cab. The front and rear cab support assemblies 30, 100 will be described for only one side of the frame 10 as, in this exemplary embodiment, they may be identically reflected on the other side of the frame 10.

The cab 20 includes a roof 21, two front support posts 23 (alternatively called A posts), two side support posts (alternatively called B posts) 24, two rear support posts (alternatively called C posts) 25, and a floor 26. The cab 21 has a lower portion 21a toward the front of the cab 20 and a higher portion 21b toward the rear of the cab 20.

Figure 2:
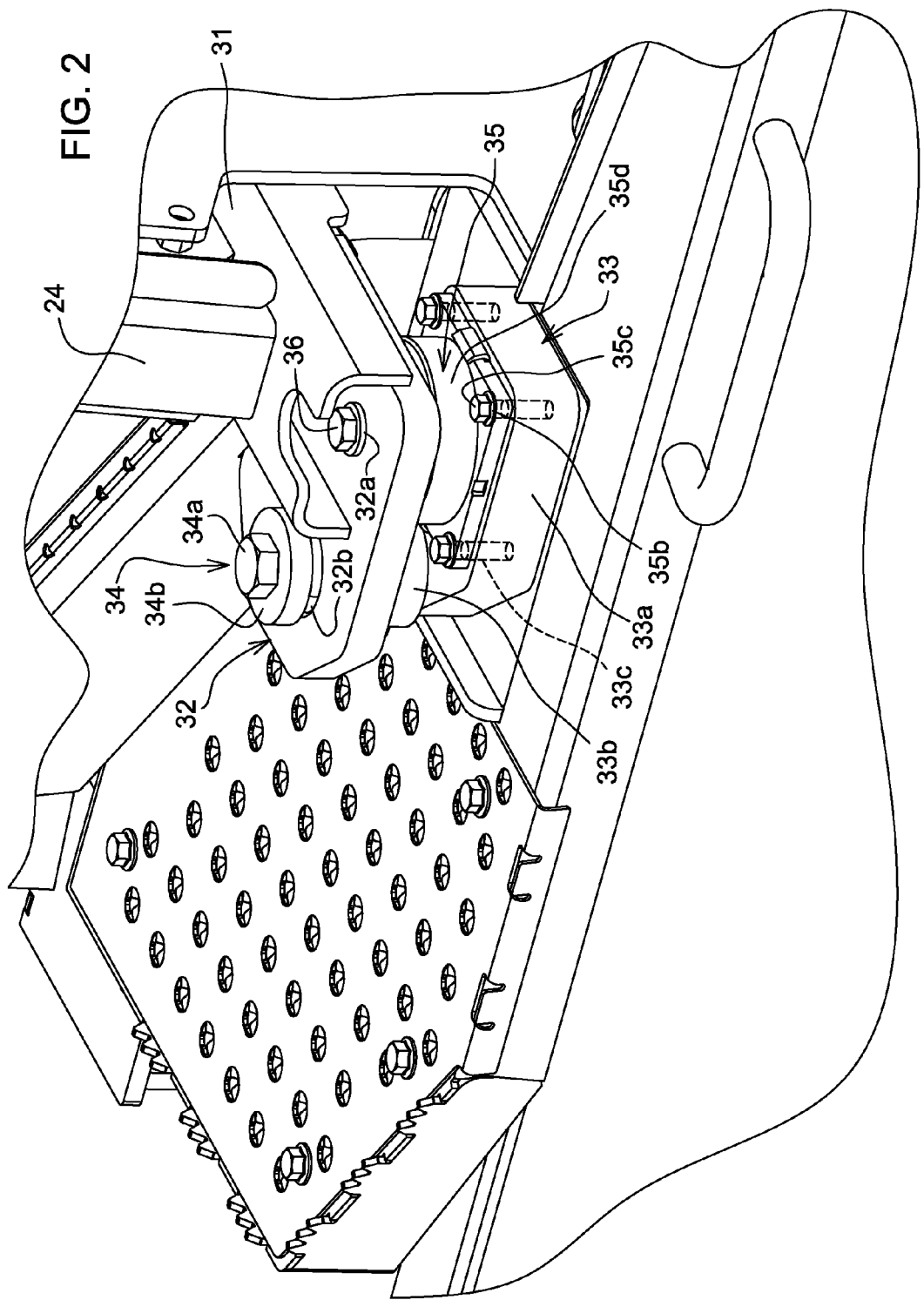
FIG. 2 is an enlarged oblique view of the front mounting assembly from a first side of the frame.

As illustrated in FIG. 2, in this exemplary embodiment, the cab 20 is supported at B post 24 via a front cab support assembly 30 which includes: a channel shaped front support bar 31 spanning the width of the cab 20 between the two B posts 24; a front support plate 32 welded to an end of the front support bar 31 and having an anchor hole 32a and a clearance hole 32b; a front mounting pad 33 welded to the frame 10 and including threaded holes (not shown), a lower mounting pad support area 33a, an elevated mounting pad support area 33b, damper hole (not shown) and threaded motion limiter attachment hole (not shown); a motion limiter bolt assembly 34 including a motion limiter bolt 34a having a diameter less than the diameter of the clearance hole 32b and a motion limiter washer 34b welded thereto and having a diameter greater than the diameter of the clearance hole 32b; a conventional viscous damper 35 having a suspension anchor hole 35a (see FIG. 11), and a damper attachment bracket 35' with damper attachment holes 35b (See FIGS. 3 and 11 also); damper attachment bolts 35c; and a suspension anchor bolt 36.

As illustrated in FIG. 2, in this exemplary embodiment, the damper attachment bolts 35c connect the viscous damper 35 to the mounting pad 33 and, thereby, to the frame 10 via the threaded holes 33c. The suspension anchor bolt 36 connects the front support plate 32 and, thereby, the front support bar 31, to the viscous damper 35 via the threaded damper mounting hole 35a (see FIG. 9), establishing a flexible and damped suspension for the cab 20 at the B post 24.

As illustrated in FIG. 2, the motion limiter bolt 34a extends through the clearance hole 32b and is secured to the raised mounting pad support area 33b by threaded attachment via a threaded motion limiter attachment hole (not shown). The distance provided between the front support plate 32 and the motion limiter washer 34b, when the front support plate is resting atop of the elevated mounting pad support area 33b, provides a limited area in which the front support plate 32, and thus, the cab 20, may vertically move with respect to the frame 10, the motion limiter bolt assembly 34 and the elevated mounting pad support area 33b restricting further vertical movement as the motion limiter washer 34b and the elevated mounting pad support area 33b are of greater diameter than the clearance hole 32b.

A first portion 35d of the damper 35 extends above the damper attachment bracket 35b. A second portion 35e of the viscous damper 35 extends below the damper attachment bracket 35' and through the damper hole 33c (see FIG. 11).

Figure 3:
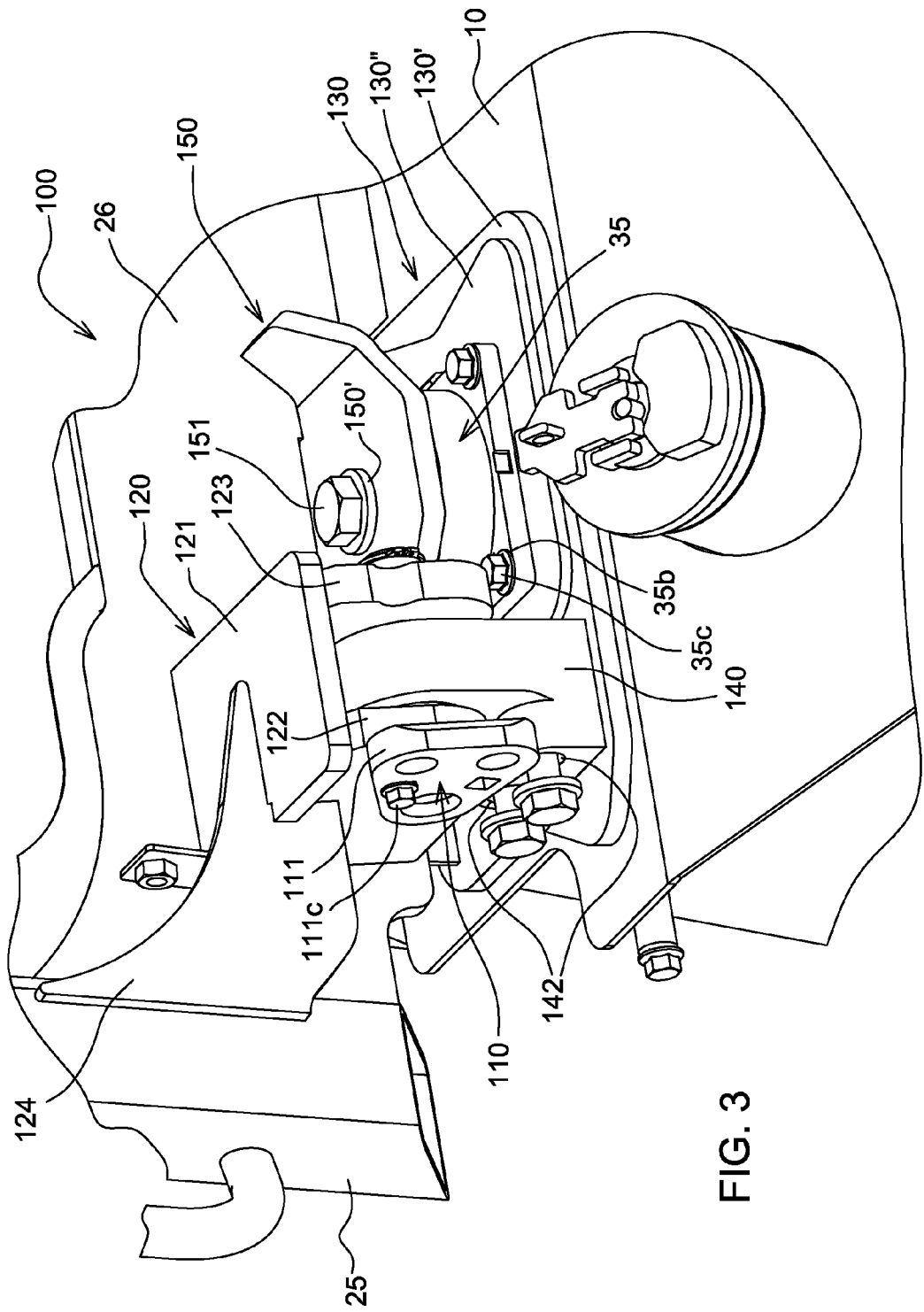
FIG. 3 is an enlarged oblique view of the rear mounting assembly from the first side of the frame.

As illustrated in FIG. 3, the cab 20 is supported near C post 25 via a rear cab support assembly 100, including: a cab support pin 110; a cab attachment bracket 120; a rear mounting pad 130 welded to the frame 10 over the fuel tank (not shown) and having a lower rear mounting pad portion 130' and an elevated rear mounting pad portion 130"; a travel limiting bracket 140 welded to the rear mounting pad 130; a rear support plate 150 welded to the rear cab panel 26 and the cab attachment bracket 120 and including a rear anchor hole 150' (see FIG. 11 also); and a conventional viscous damper 35 having a threaded anchor hole 35a and damper attachment bracket 35' with holes 35b (see FIG. 11 also); rear suspension anchor bolt 151; and damper attachment bolts 35c.

Figure 4:
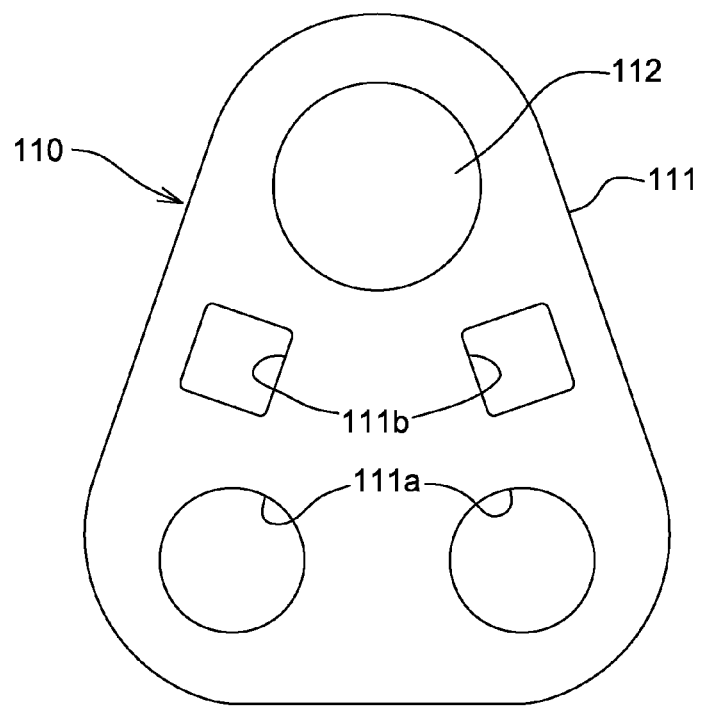
FIG. 4 is a side view of a cab support pin.
Figure 5:
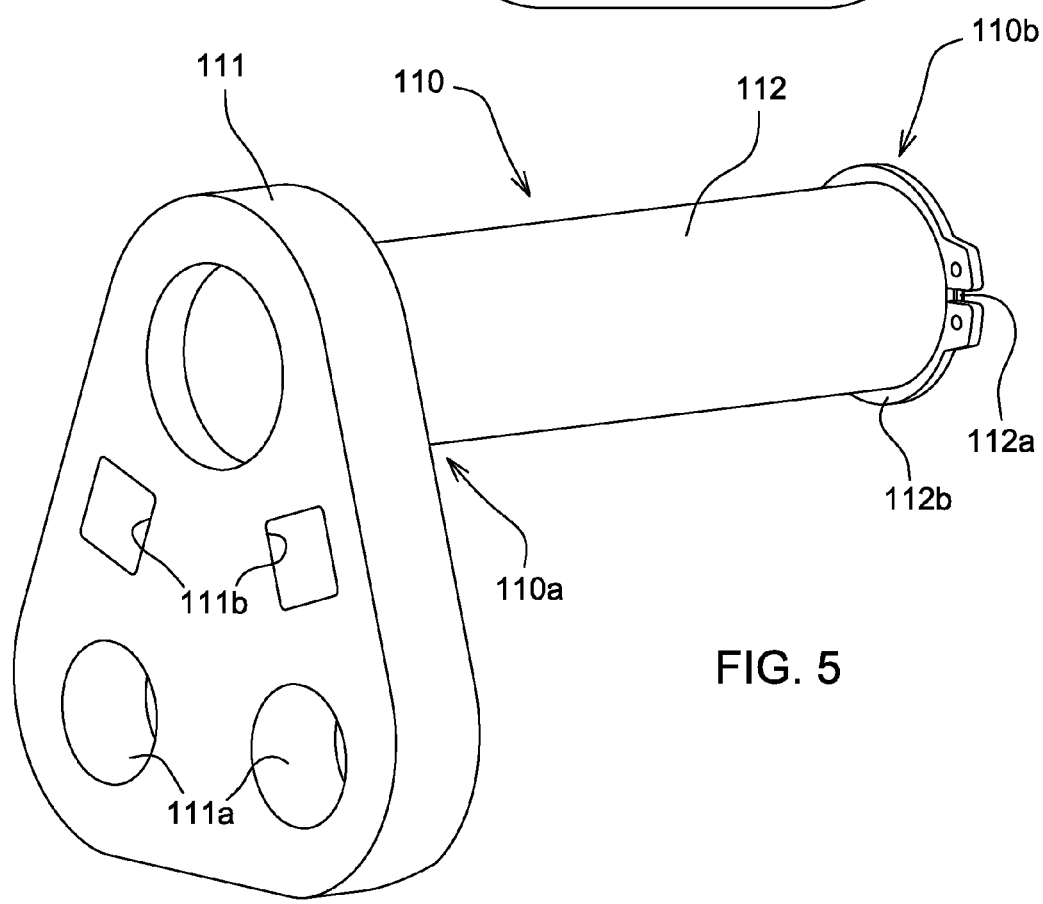
FIG. 5 is an oblique view of the cab support pin of FIG. 4.

As illustrated in FIGS. 4 and 5, the cab support pin 110 includes a flag 111 at a first end 110a of the cab support pin 110 and a shank 112 having a groove 112a, the groove positioned near a second end 110b of the cab support pin 110. The flag 111 includes cab support holes 111a and anchor holes 111b. Dual anchor holes 111b exist to allow each cab support pin 110 to be similarly located angularly regardless of the side of the frame 10 on which it is placed.

Figure 6:
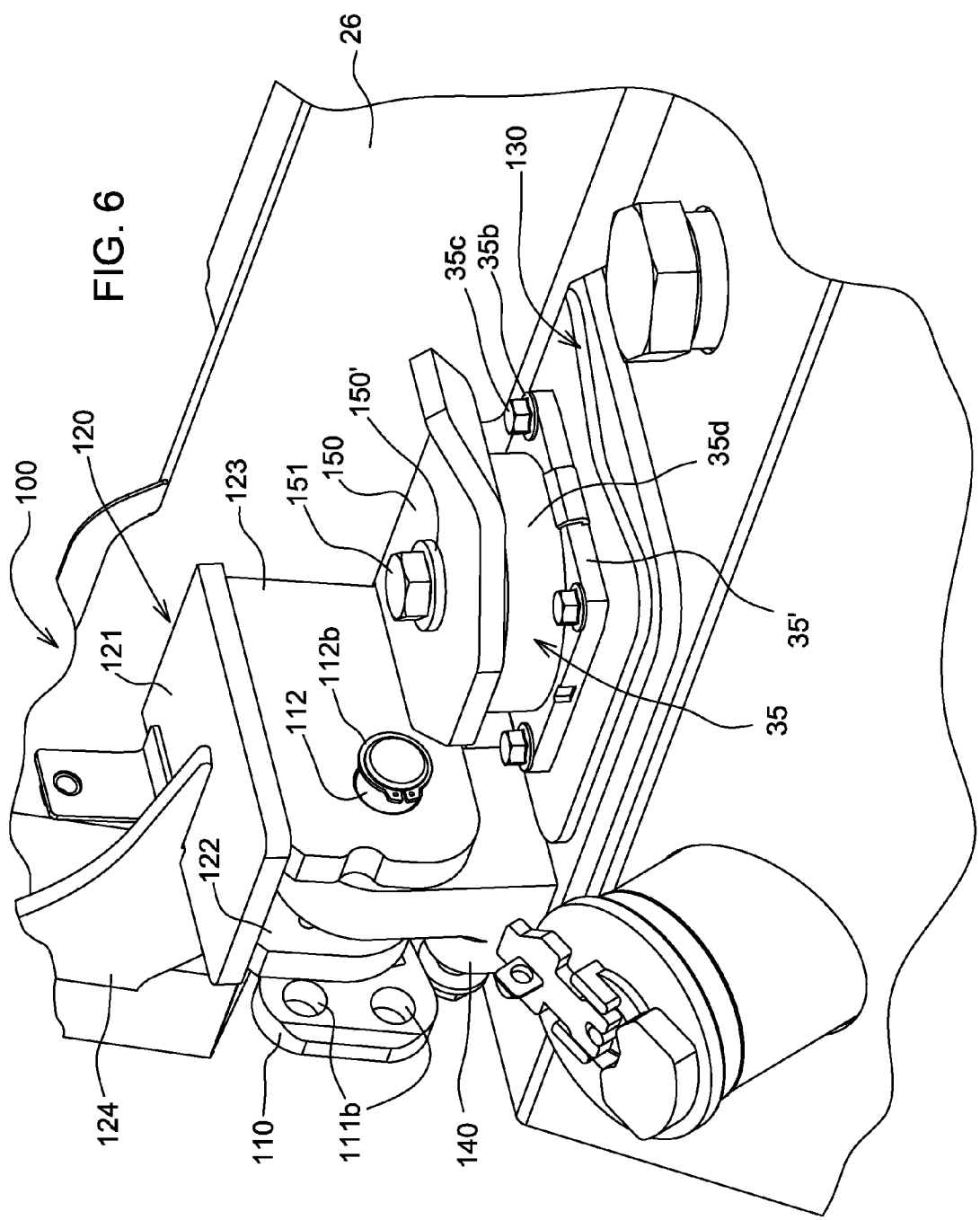
FIG. 6 is an enlarged oblique view of the rear mounting assembly of FIG. 3 from a second side of the frame.

As shown in FIG. 6, in this exemplary embodiment the damper attachment bolts 35c connect the viscous damper 35 to the mounting pad 130 and, thereby, to the frame 10 of the vehicle (not shown) via the damper attachment holes 35b and the threaded holes (not shown) in the rear mounting pad 130. As illustrated, a first portion 35d of the damper 35 extends above the damper attachment bracket 35'. A second portion 35e of the viscous damper 35 extends below the damper attachment bracket 35' and through the damper anchor hole 132 (See FIG. 11).

Figure 7:
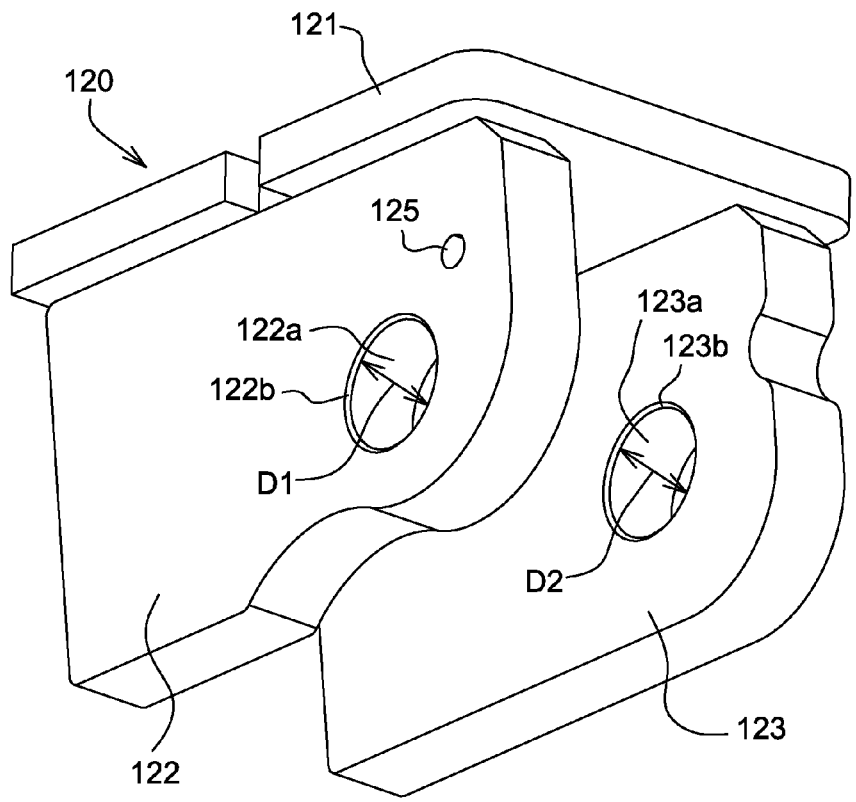
FIG. 7 is an oblique view of a cab attachment bracket.
Figure 8:
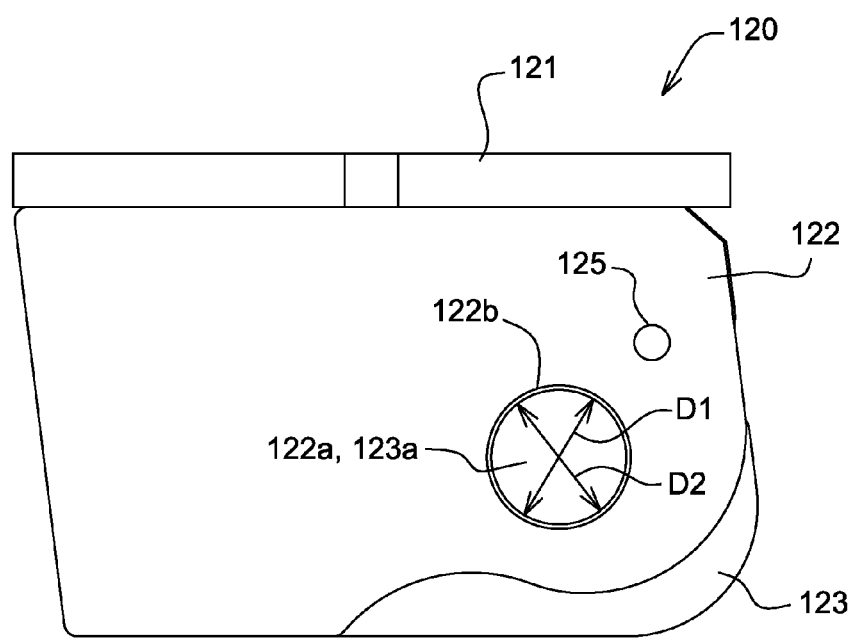
FIG. 8 is a side view of the cab attachment bracket of FIG. 6.
Figure 11:
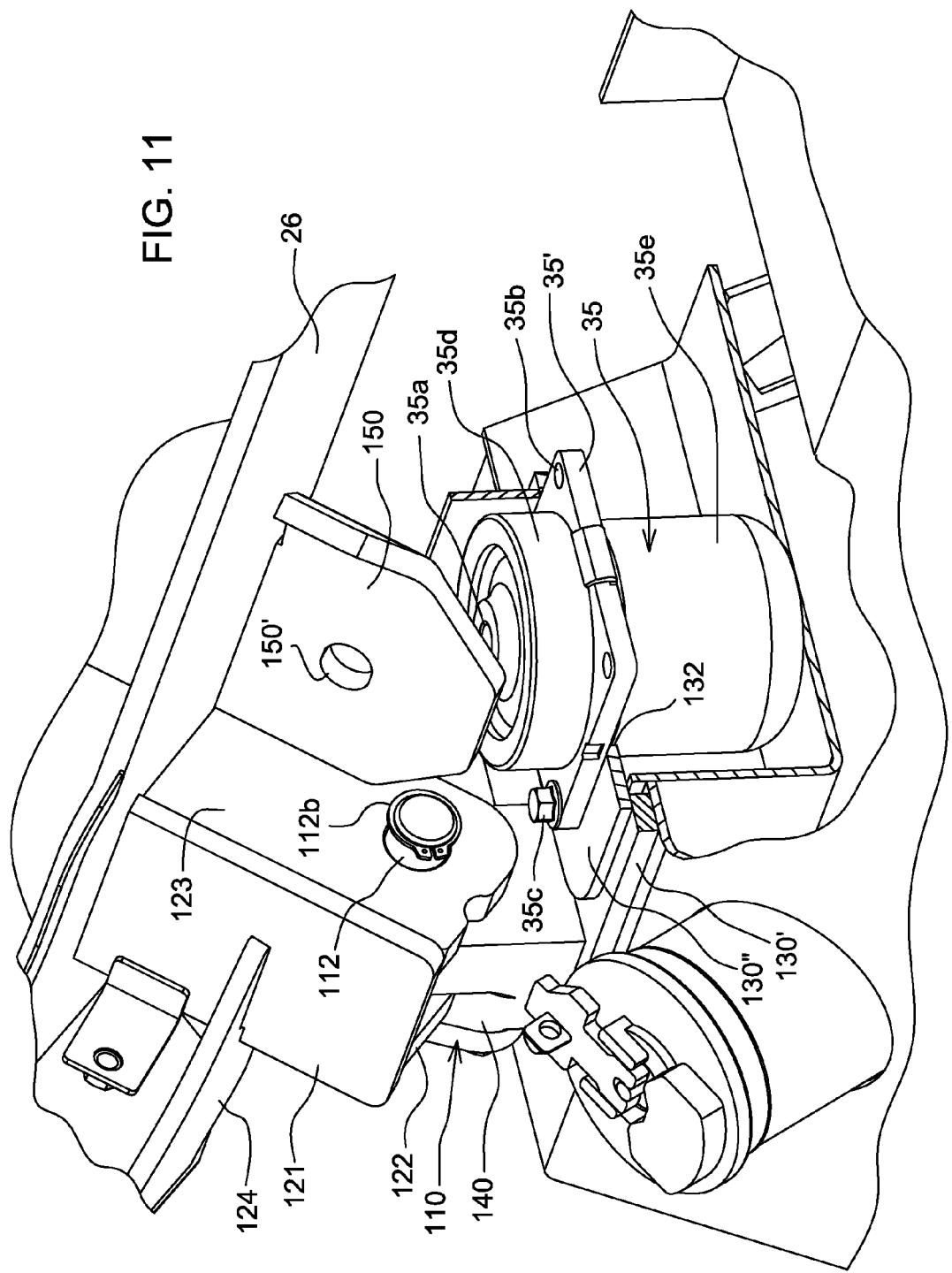
FIG. 11 is a perspective view of the rear mounting assembly of FIG. 6 after the cab is rotated.

As shown in FIGS. 7 and 8, in this exemplary embodiment the cab attachment bracket 120 includes: an upper plate 121; a first side plate 122; and a second side plate 123. The first side plate 122 is positioned closer to the C post 25 than the second side plate 123. The upper plate 121, the first side plate 122, and the second side plate 123 are welded together as illustrated. The attachment bracket is welded to the rear cab panel 26 as illustrated in FIGS. 3, 6 and 11. A bracket brace 124 is welded to the top plate 121, the first side plate 122, and the C post 25 for additional structural support for the attachment bracket 120 (see FIGS. 3, 6 and 11). As shown in FIG. 8, the side plates 122, 123 include substantially coaxial first and second cylindrical holes 122a, 123a having substantially equal diameters D1, D2 and including chamfers 122b, 123b for ease of pin insertion. The first side plate 122 also includes a threaded flag attachment hole 125 for the flag 111 of the cab support pin 110.

Figure 9:
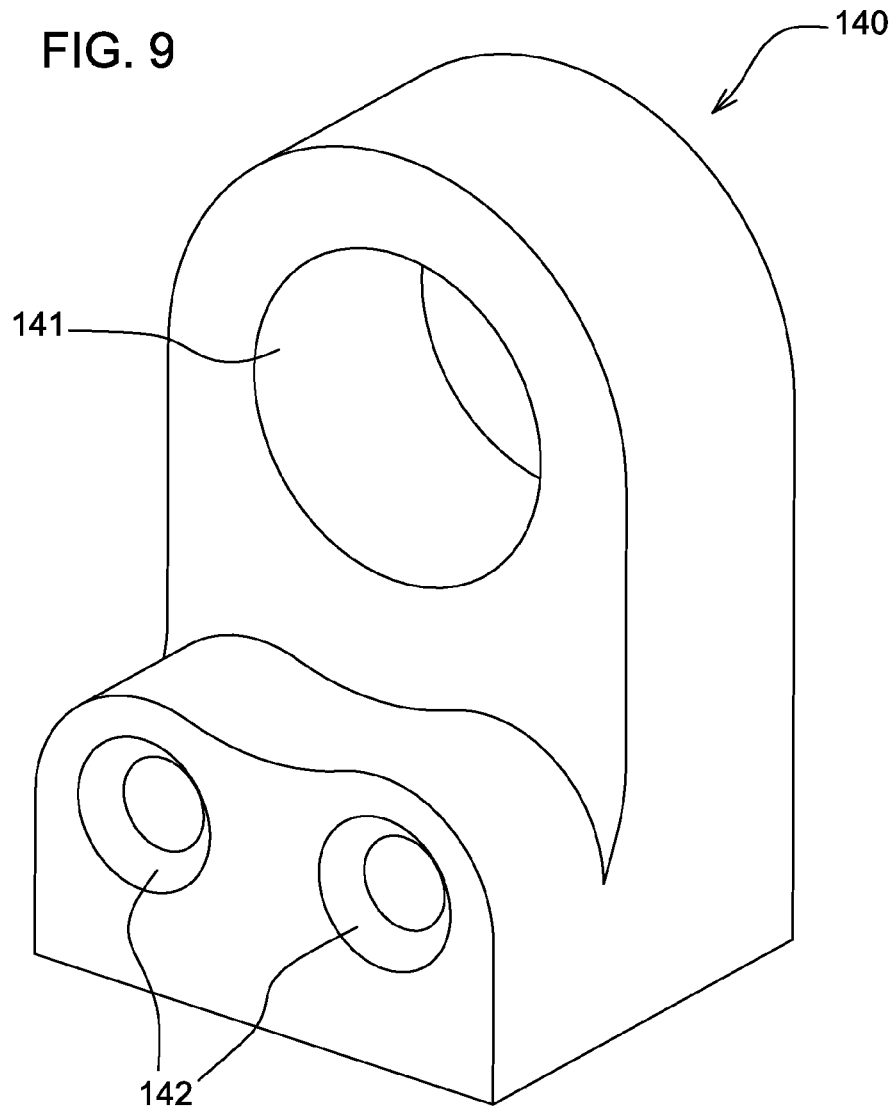
FIG. 9 is an oblique view of a travel limiting bracket.
Figure 10:
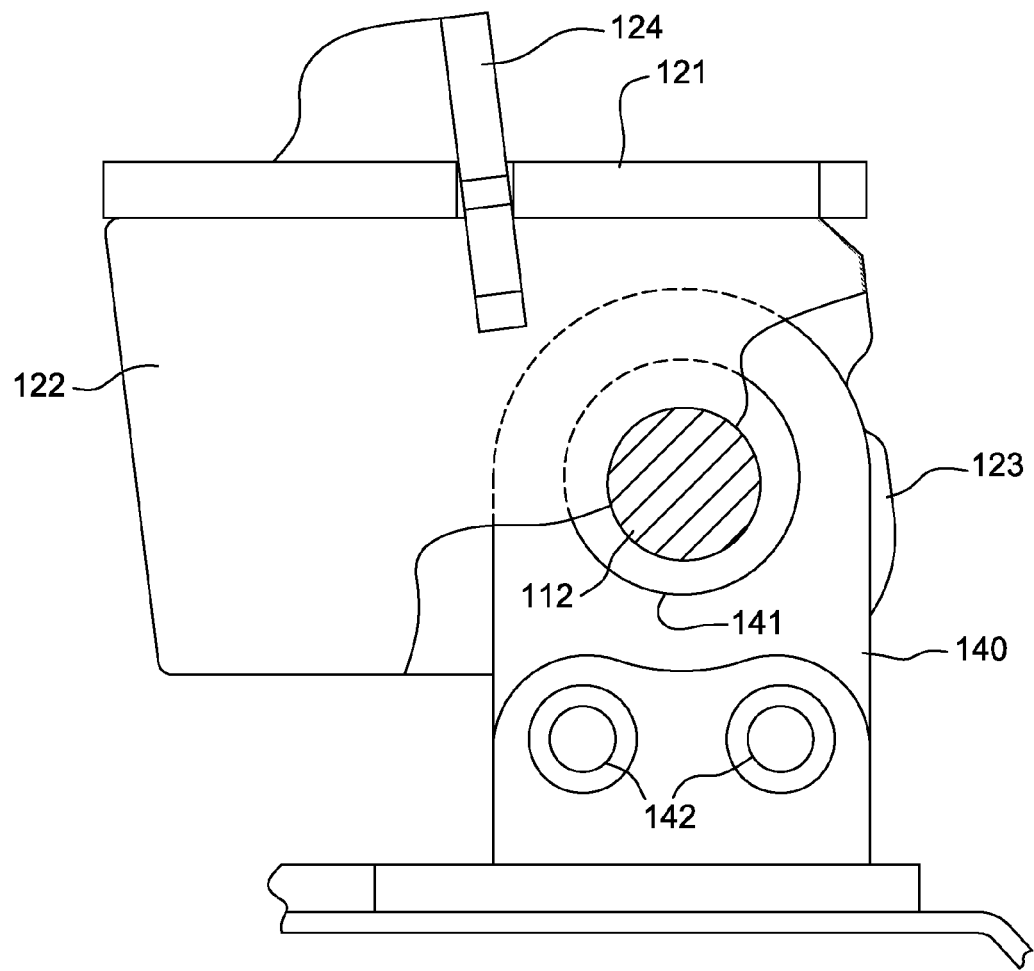
FIG. 10 is a side view of the cab attachment bracket of FIG. 8, the travel limiting bracket of FIG. 9 and the cab support pin of FIG. 5 after assembly.

As shown in FIGS. 9 and 10, the travel limiting bracket 140 is, in this particular embodiment, welded to the rear mounting pad 130, and includes a clearance hole 141 and threaded flag support holes 142. The clearance hole 141 is sized to allow a desired amount of vertical, horizontal, and rotational movement for the shank 112 when the cab is supported by the rear viscous damper 35 during vehicle operations. As shown in FIGS. 3, 6 and 11, the rear support plate 150 may be welded to the second side plate 123 of the attachment bracket 120 and the rear cab panel 26. The rear suspension anchor bolt 151 connects the viscous mount 35 to the rear support plate 150 and, thereby, to the cab attachment bracket 140 and the cab 110 via the threaded damper anchor hole 35a.

As indicated in FIGS. 3 and 6, the shank 112 extends through the first cylindrical hole 122a of the cab attachment bracket 120, the clearance hole 141 of the travel limiting bracket 140 and the second cylindrical hole 123a of the cab attachment bracket 120. A snap ring 112b fits into groove 112a to hold the shank in place longitudinally.

Figure 12:
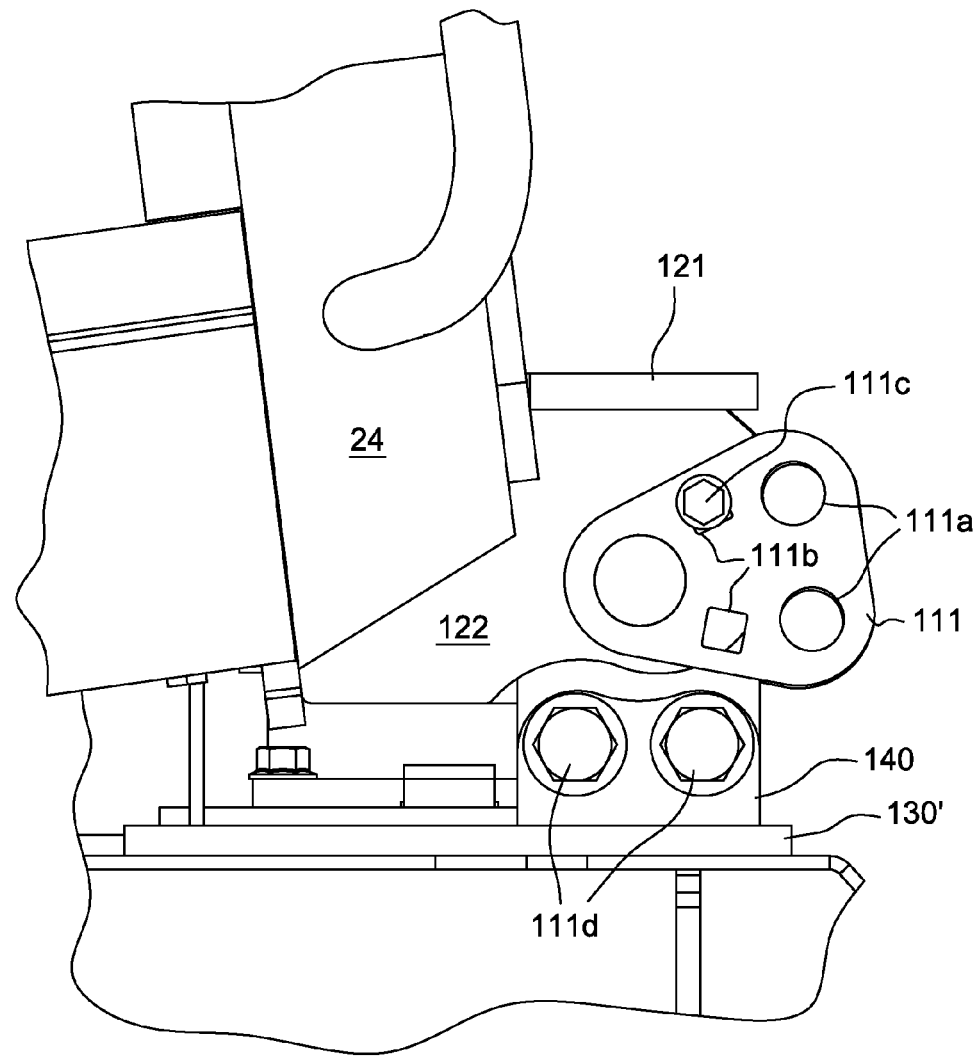
FIG. 12 is a side view of the cab and the rear mounting assembly when the mounting assembly is adjusted for vehicle operations.

As shown in FIGS. 3 and 12, when the cab 20 is suspended, i.e., when the rear support plate 150 is supported by the viscous damper 35, the flag 111 of the cab support pin 110 is connected to the cab attachment bracket 120 via a flag anchor bolt 111c. Thus, the cab support pin 110 may float with respect to the motion limiting bracket 140 but is fixed, with respect to the attachment bracket 120.

In operation, to accomplish cab rotation, the cab support screws 111d are removed from the threaded flag support holes 142, the flag anchor bolt 111c is removed from the threaded flag attachment hole 125 and the cab support pin 110 is rotated to align the cab support holes 111a with the threaded flag support holes 142. The cab support screws 111d are then fitted through the cab support holes 111a and screwed into the flag support holes 142. Finally, suspension anchor bolt 151 is removed from the threaded damper mounting hole 35a and the rear anchor hole 150' and the cab 20 is rotated to the service position and held in place with the aid of a hydraulic cylinder (not shown).

Figure 13:
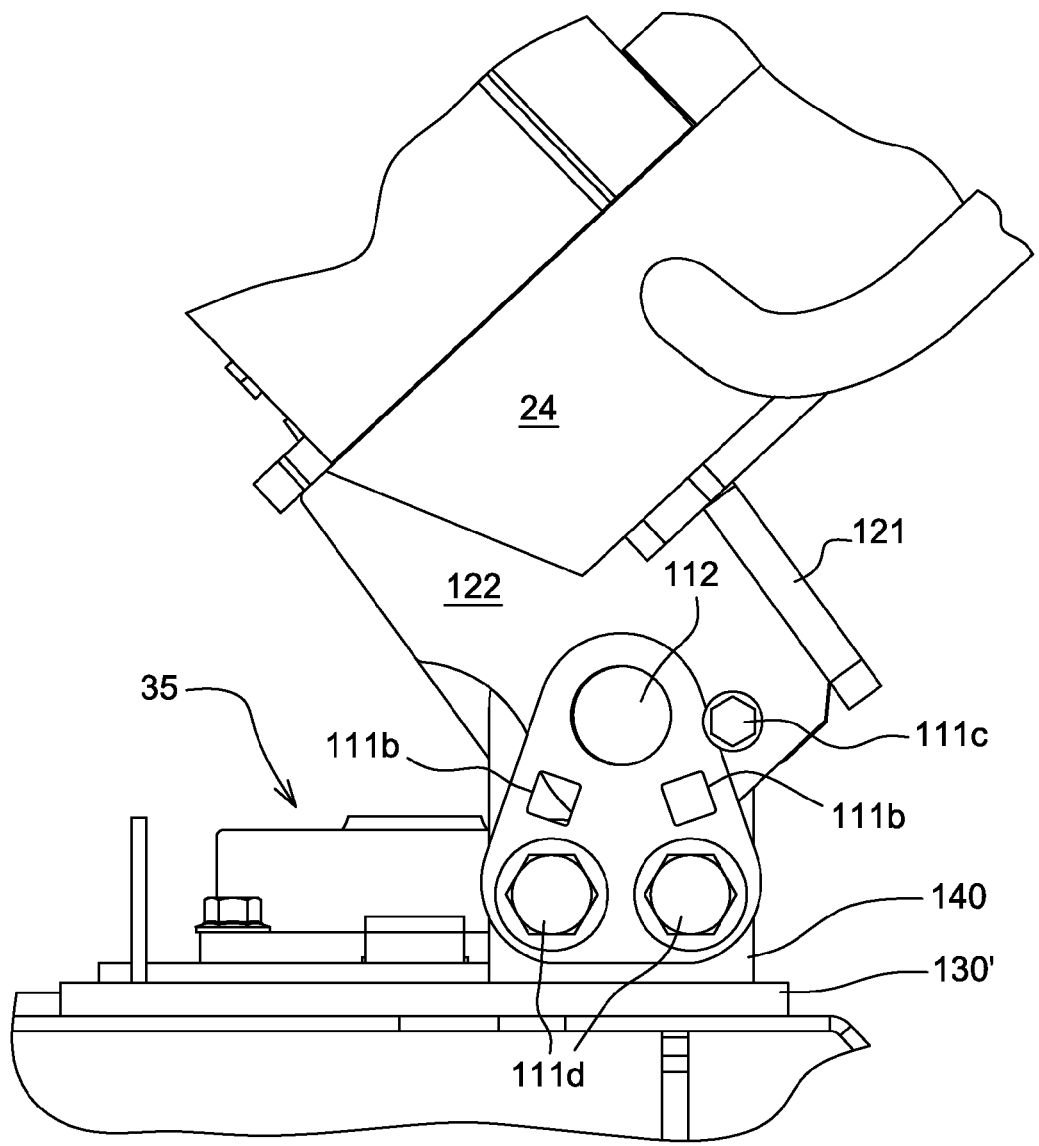
FIG. 13 is a side view of the cab and the rear mounting assembly when the mounting assembly is adjusted for vehicle servicing.

To return the cab 20 to suspension for vehicle operation, the flag anchor bolt 111c is removed and the cab 20 is rotated from the service position to the operating position shown in FIG. 12. The suspension anchor bolt 36 is then fitted through the rear anchor hole and screwed into the threaded damper mounting hole 35a. The cab support screws 111d are then removed, the flag is rotated to align the flag anchor hole 111b with the threaded flag attachment hole 125 and the anchor bolt 111c is fitted through the flag anchor hole 111b and screwed into the threaded flag attachment hole 125 to attach the flag 111 of the cab support pin 110 to first side plate 122 of the cab attachment bracket 120. Finally, the cab support screws 111d are re-screwed into the flag support holes 142. FIGS. 12 and 13 illustrate views of the cab 20 and the cab support pin 110 when the cab 20 is in the work, or suspended position and the raised, or service, position, respectively.

Having described the preferred embodiment, it will become apparent that various modifications can be made without departing from the scope of the invention as defined in the accompanying claims.

The invention claimed is:

1. A vehicle comprising:
a frame;
an operator cab;
a cab support pin having a shank portion and a retainer portion;
a flexible coupling for movably mounting the operator cab to the frame;
a first mounting assembly releasably connecting the cab to the frame; and
a second mounting assembly having a first adjustment in which the cab is connected to the frame via the flexible coupling and a second adjustment in which the cab support pin connects the cab to the frame, the cab support pin acting as a motion limiter for roll over in the first adjustment, when the second mounting assembly is in the second adjustment the cab support pin is fixed relative to at least one of the cab and frame.

2. A vehicle comprising:
a frame;
an operator cab;
a cab support pin having a shank portion and a retainer portion;
a flexible coupling for movably mounting the operator cab to the frame;
a first mounting assembly releasably connecting the cab to the frame; and
a second mounting assembly having a first adjustment in which the cab is connected to the frame via the flexible coupling and a second adjustment in which the cab support pin connects the cab to the frame, the cab support pin acting as a motion limiter for roll over in the first adjustment, the cab support pin when in the second adjustment provides an axis of rotation about which the cab is able to rotate between an operation position and a servicing position.

3. A vehicle comprising:
a frame;
an operator cab;
a cab mounting assembly including, a cab support pin and a flexible coupling, the cab support pin having a shank portion and a retainer portion, the mounting assembly having a first adjustment in which the cab is releasably mounted to the frame via the shank portion and the flexible coupling in a first connection and a second adjustment in which the cab is mounted to the frame via the shank portion and the retainer portion in a second connection, the cab support pin acting as a motion limiter for roll over in the first adjustment, when the mounting assembly is in the second adjustment the cab support pin has a fixed position relative to at least one of the cab and frame.

4. The vehicle of claim 3, wherein the second connection is a rotatable connection.

5. The vehicle of claim 1, wherein the flexible coupling is a viscous mount.

6. The vehicle of claim 3, wherein the flexible coupling is a viscous mount.

7. The vehicle of claim 1, wherein the first adjustment provides to limit movement of the cab relative to the frame to a distance that is less than the diameter of the shank.

8. The vehicle of claim 1, wherein the second adjustment causes the shank to provide a fulcrum about which the cab rotates.

9. The vehicle of claim 1, wherein rotating the support pin causes the cab support pin to switch from the first adjustment to the second adjustment.

10. The vehicle of claim 9, wherein switching from the first adjustment to the second adjustment is performed about a longitudinal axis of the shank.

11. The vehicle of claim 10, wherein the first adjustment fixedly couples the cab support pin relative to the cab while variably coupling the cab support pin to the frame, and the second adjustment fixedly coupled the cab support pin to the frame while variably coupling the cab support pin to the cab.

12. The vehicle of claim 1, wherein the shank and retainer portions are not capable of non-destructive separation.

13. The vehicle of claim 1, wherein the retainer is a flag having a plurality of retaining holes therein operable to receive a fastener therethrough to couple the cab support pin to one of the cab and the frame.

14. The vehicle of claim 1, wherein the cab support pin has a fixed length.

15. The vehicle of claim 1, further including a second cab support pin positioned such that the shanks of the cab support pins, when both are in the second adjustment positions, define a common longitudinal axis.

16. The vehicle of claim 1, wherein the first adjustment suspends the cab support pin out of contact with the cab when the vehicle is not in a roll over position.

17. The vehicle of claim 3, wherein the second adjustment causes the shank to provide a fulcrum about which the cab rotates.

18. The vehicle of claim 2, wherein rotating the support pin causes the cab support pin to switch from the first adjustment to the second adjustment.

19. The vehicle of claim 2, further including a second cab support pin positioned such that the shanks of the cab support pins, when both are in the second adjustment positions, define a common longitudinal axis.

20. The vehicle of claim 2, wherein the first adjustment suspends the cab support pin out of contact with the cab when the vehicle is not in a roll over position.

* * * * *